United States Patent
Chen et al.

(10) Patent No.: US 10,698,735 B2
(45) Date of Patent: Jun. 30, 2020

(54) AUTO-SCALING FOR ALLOCATION OF CLOUD SERVICE RESOURCES IN APPLICATION DEPLOYMENTS

(71) Applicant: Citrix Systems, Inc., Fort Lauderdale, FL (US)

(72) Inventors: Yongyu Chen, Nanjing (CN); John Carlo Vincent Cattaneo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 115 days.

(21) Appl. No.: 15/896,884

(22) Filed: Feb. 14, 2018

(65) Prior Publication Data
US 2019/0250949 A1   Aug. 15, 2019

(51) Int. Cl.
  G06F 9/50    (2006.01)
  H04L 12/911  (2013.01)
  H04L 12/26   (2006.01)
  G06F 8/65    (2018.01)

(52) U.S. Cl.
  CPC .......... *G06F 9/505* (2013.01); *H04L 43/062* (2013.01); *H04L 43/0876* (2013.01); *H04L 47/823* (2013.01); *G06F 8/65* (2013.01); *G06F 9/5072* (2013.01)

(58) Field of Classification Search
  CPC .......... G06F 9/505; G06F 8/65; G06F 9/5072; H04L 43/062; H04L 43/0876; H04L 47/823
  See application file for complete search history.

(56) References Cited

U.S. PATENT DOCUMENTS

| | | | |
|---|---|---|---|
| 9,356,883 B1 * | 5/2016 | Borthakur | H04L 41/5025 |
| 2015/0067171 A1 * | 3/2015 | Yum | G06F 9/5072 709/226 |
| 2016/0094479 A1 * | 3/2016 | Dwarkha | H04L 47/12 370/232 |

* cited by examiner

*Primary Examiner* — Kim T Nguyen
(74) *Attorney, Agent, or Firm* — Foley & Lardner LLP

(57) ABSTRACT

Described embodiments provide systems and methods of allocating cloud resources for application deployments. A resource allocator may identify a first metric indicating usage of cloud resources by clients in a first release environment for an application update. The resource allocator may generate, using the first metric, a resource capacity model for predicting usage of the cloud resources by clients in a second release environment for the application update. The resource allocator may determine, using the resource capacity model, a metric predicting the usage of the cloud resources by the clients in the second release environment. The resource allocator may generate instructions to set an allocation of the cloud computing resources for performing deployment of the application update to the second release environment based on the second metric.

20 Claims, 6 Drawing Sheets

AUTO-SCALING FOR ALLOCATION OF CLOUD SERVICE RESOURCES IN APPLICATION DEPLOYMENTS

FIELD OF THE DISCLOSURE

The present application generally relates to application deployments. In particular, the present application relates to systems and methods for allocating cloud-based resources in application deployments.

BACKGROUND

Cloud-based resources may be utilized in carrying out deployments of application updates to a multitude of clients. Existing techniques, however, may not take account of computing processing resource and network bandwidth consumption in allocation of such cloud-based resources in carrying out the deployments. As such, the deployments of application updates to multitude of clients may lead to suboptimal performance.

BRIEF SUMMARY

The present disclosure is directed towards systems and methods of allocating cloud resources for application deployments. Cloud-based services (e.g., Infrastructure as a Service (IaaS), Platform as a Service (PaaS), and Software as a Service (SaaS)) may be used to perform deployments of application updates to multiple clients (e.g., virtual machine instances). Software providers may upload application updates onto servers of the cloud-based services to deliver to clients. During the course of each deployment, the utilization of cloud resources, such as computer processing power and network bandwidth, may fluctuate. Furthermore, the availability of the cloud resources may also vary, as cloud servers are taken online and offline from the application update deployment. Current cloud-based application delivery platforms, however, may use static or fixed allocations of cloud resources, not taking into account of such variabilities in the utilization and the availability of cloud resources in the deployments of the application updates. As such, these variances may lead to suboptimal performance in carrying out the deployments of application updates, such as delays and stoppages of the deployment itself. The reduction in performance in cloud-based application deliveries may be further exacerbated with the increase in the number of clients receiving the application updates.

To address the degradation in performance of the deployments of application updates, the present systems and methods provide a resource capacity model for allocation of cloud resources for application deployments. An application may be deployed in multiple successive environments, such as development, testing, staging, and then production. The staging and production deployment environments may be the most relevant deployment environments in determining the allocation of cloud resources. The resource capacity model may be used to allocate cloud resources for the application update deployment in one release environment (e.g., production) using the runtime data acquired during the application update deployment in a previous release environment (e.g., staging).

For constructing the resource capacity model, a resource allocator may first aggregate runtime data from clients of the staging release environment. The aggregated runtime data may include mean values of a computing resource consumption metric (e.g., CPU usage) and a network bandwidth metric (e.g., number of requests) over a predefined sampling interval (e.g., every five minutes). Furthermore, the original sample of the computing resource consumption metric and the network bandwidth metric may not correspond to the same sampling times. To account for the disparity in sampling times, a mean value across the same time frame may be calculated. Additional statistical techniques may be applied to the sampled runtime data for smoothing, such as x-means clustering and outlier filtering. Using the aggregated runtime data, the resource allocator may determine usage of the cloud resources by the clients from the staging release environment. The two metrics may be paired based on the sampling at the predefined interval in the aggregated runtime data.

Using the computing resource consumption metric and the network bandwidth metric of the clients from the staging release environment, the resource allocator may establish the resource capacity model. The resource capacity model may be a linear regression model, with the network bandwidth metric as the explanatory variable ("x") and the computing resource consumption metric as the scalar-dependent variable ("y"). Based on the sampled runtime data, the resource allocator may apply auto-regression techniques to determine the relationship (also referred to as model parameters or regression coefficients) between the network bandwidth metric and the computing resource consumption metric. To account for any statistical bias in the mean values in the metrics introduced from the predefined sampling period, the resource allocator may determine statistical measures of the aggregated runtime data, such as the standard deviation to estimate a bias in the resource capacity model.

With the determination of the relationship between the network bandwidth metric and the computing resource consumption metric, the resource allocator may predict or estimate an allocation of cloud resources for the subsequent production release environment. The relationship between the network bandwidth metric and the computing resource computing metric determined using the runtime data of the staging release environment may be applicable to the relationship of the two metrics in the subsequent production release environment. In general, the production release environment may have a greater number of clients than the number of clients in the staging release environment. The resource capacity model may provide a baseline estimate for the allocation of cloud resources for the production release environment. To account for the greater number of clients in the production release environment, the resource allocator may establish the resource capacity model using a mean value of the metrics measured from the runtime data. From the original sampled data, the resource allocator may then calculate a multiple of standard deviations (e.g., $2\sigma$ to $5\sigma$) of a distribution of the original sampled data to predict a usage, for instance, a maximum potential usage of the cloud resources for the production release environment. The predicted maximum usage of the cloud resources may also be at the same predefined sampling interval as the aggregated runtime data Using the predicted metrics, the resource allocator may generate instructions for the cloud-based application distribution platform to allocate cloud resources in accordance with the predicted metrics. In addition, while the deployment of the application update to the clients of the production release environment is carried out, the resource allocator can aggregate additional runtime data. The resource allocator can adjust the resource capacity model based on the newly aggregated additional runtime data. With the adjusted resource capacity model, the resource allocator may modify the instructions for the cloud-based application distribution platform to alter the allocation of cloud resources for the application update deployment.

By allocating cloud resources using the resource capacity model in this manner, the resource allocator may improve the allocation of cloud resources from the beginning of and during the application update deployment. Furthermore, dynamically adjusting the resource capacity model may prevent any stoppages or degradation of performance during the deployment of the application update. In addition, the use of runtime data from a prior release environment may allow for integration of A/B testing in application updates.

At least one aspect of this disclosure is directed to a method of allocating cloud resources for application deployment. A resource allocator executing on one or more processors may identify a first computing resource metric and a first network traffic metric indicating usage of cloud resources by a first plurality of clients in a first release environment for an application update. The resource allocator may generate, using the first computing resource metric and the first network traffic metric, a resource capacity model for predicting usage of the cloud resources by a second plurality of clients in a second release environment for the application update subsequent to the first release environment. The resource allocator may determine, using the resource capacity model, a second computing resource metric and a second network traffic metric predicting the usage of the cloud resources by the second plurality of clients in the second release environment. The resource allocator may generate instructions to set an allocation of the cloud computing resources for performing deployment of the application update to the second plurality of clients in the second release environment based on the second computing resource metric and the second network traffic metric predicted using the resource capacity model.

In some embodiments, identifying the first computing resource metric and the first network traffic metric may include aggregating runtime data from the first plurality of clients running the application update in the first release environment. In some embodiments, identifying the first computing resource metric and the first network traffic metric may include applying extract-load-transfer (ETL) onto the aggregated runtime data to calculate the first computing resource metric including a rate of processor resource usage and the first network traffic metric including a rate of requests. In some embodiments, identifying the first computing resource metric and the first network traffic metric may include generating a data pair including the rate of processor resource usage of the first computing resource metric and the rate of requests of the first network traffic metric.

In some embodiments, identifying the first computing resource metric and the first network traffic metric may include aggregating first runtime data from the first plurality of clients running the application update in the first release environment. In some embodiments, identifying the first computing resource metric and the first network traffic metric may include eliminating one or more outliers identified based on clustering the first runtime data to generate second runtime data. In some embodiments, identifying the first computing resource metric and the first network traffic metric may include determining the first computing resource metric and the first network traffic metric from the second runtime data.

In some embodiments, identifying the first computing resource metric and the first network traffic metric may include aggregating Hypertext Transfer Protocol (HTTP) messages communicated by the first plurality of clients running the application update in the first release environment. In some embodiments, identifying the first computing resource metric and the first network traffic metric may include identifying a ratio between a number of the first plurality of clients and a number of the second plurality of clients. In some embodiments, identifying the first computing resource metric and the first network traffic metric may include sampling the HTTP responses of a pre-specified code based on the ratio between the number of the first plurality of clients and the number of second plurality of clients. In some embodiments, identifying the first computing resource metric and the first network traffic metric may include calculating the first network traffic metric based on the sampling of the HTTP responses.

In some embodiments, generating the resource capacity model may include generating the resource capacity model including a regression model, the regression model comprising the first computing resource metric as an explanatory variable and the first network traffic metric as a dependent variable. In some embodiments, generating the resource capacity model may include generating the resource capacity model based on a rate of processor resource usage of the first computing resource metric, a rate of requests of the first network traffic metric, and a noise parameter.

In some embodiments, determining the second computing resource metric and the second network traffic metric may include determining a distribution of consumption metric based on the resource computing model. In some embodiments, determining the second computing resource metric and the second network traffic metric may include calculating a maximum resource capacity based on a mean value and a standard deviation of the distribution of consumption metric. In some embodiments, determining the second computing resource metric and the second network traffic metric may include determining the second computing resource metric and the second network traffic metric based on the maximum resource capacity calculated from the mean value and the standard deviation.

In some embodiments, determining the second computing resource metric and the second network traffic metric may include determining the second computing resource metric and the second network traffic metric based on the resource capacity model and a security level measure. The security level measure may be specified based on a number of instances of the second plurality of clients in the second release environment.

In some embodiments, the resource allocator may identify while performing deployment of the application update to the second plurality of clients in the second release environment, a third computing resource metric and a third network traffic metric indicating usage of cloud resources by the second plurality of clients in the second release environment for an application update. In some embodiments, the resource allocator may modify the resource capacity model based on the third computing resource metric and the third network traffic. In some embodiments, the resource allocator may update the instructions to set the allocation of the cloud computing resources for performing the deployment of the application update in the production environment. In some embodiments, the resource allocator may execute the instructions to set the allocation of the cloud computing resources to perform the application update to the second plurality of clients in a production environment corresponding to the second release environment subsequent to a staging environment corresponding to the first release environment.

The present disclosure is further directed towards provisioning capacity based on network traffic during application deployments. As discussed above, cloud-based services (e.g., Infrastructure as a Service (IaaS), Platform as a Service (PaaS), and Software as a Service (SaaS)) may be used to perform deployments of application updates to multiple clients. Software providers may upload application updates onto servers of the cloud-based services to deliver to clients. During the course of each deployment, the utilization of cloud resources, such as computer processing power and network bandwidth, may fluctuate. Furthermore, the availability of the cloud resources may also vary, as cloud servers are taken online and offline from the application update deployment. Current cloud-based application delivery platforms, however, may use static or fixed allocations of cloud resources, not taking into account of such variabilities in the utilization and the availability of cloud resources during the deployments of the application updates. To the extent that cloud resources are pre-allocated, such allocations of cloud resources in current techniques may take machine utilization, not network bandwidth usage, into consideration. As such, these variances may lead to suboptimal performance in carrying out the deployments of application updates, such delays and stoppages of the deployment. The reduction in performance in cloud-based application deliveries may be further exacerbated with the increase in the number of clients receiving the application updates.

To address the fluctuations in the utilization and availability of cloud resources during deployments of application updates, the present systems and methods provide a proxy server to control network traffic for delivering application updates to deployment groups. Different versions of the application may be rolled out to a multiple deployment groups of clients (e.g., virtual machine instances) from an application update provider via the proxy server. A first deployment group of clients may have been established for the deployment a first version of the application. Each client may be in communication with the proxy server in connection with the deployment of the first version of the application exchanging requests and responses. When a second version of the application is to be rolled out, a second deployment group of clients may be established for carrying out the deployment.

With the establishment of the second deployment group, the proxy server may first calculate a base capacity of the second deployment group of clients to optimally allocate the network traffic across the two deployment groups. The base capacity may correspond to ta number of clients initially in the second deployment group, and may correlate to the network throughput that the second deployment group can initially handle. In general, the second deployment group of clients may initially number less than the first deployment group of clients. Based on the base capacity, the proxy server may initialize deployment the second version of the application to the second deployment group, while maintaining the deployment of the first version to the first deployment group. As with the clients of the first deployment group, the clients of the second deployment group may communicate with the proxy server for exchanging requests and responses in connection with the deployment of the second version. From this point onward, the proxy server may monitor the network traffic between the proxy server itself and the first deployment group and the network traffic between the proxy server itself and the second deployment group.

As additional clients are brought online into the second deployment group (e.g., by instantiating new virtual machine instances), the utilization of network traffic between the proxy server and the second deployment group may alter. The proxy server may detect the change in utilization of network traffic, from monitoring the utilization of network traffic and capacity at each deployment group. The proxy server may measure the network traffic at each deployment group as the network throughput per a number of requests. The proxy server may also calculate a current capacity of each deployment group based on the number of instances in the respective deployment group. Based on the split of network traffic and the capacity of each deployment group, the proxy server may re-allocate or shift network traffic from the first deployment group to the second deployment group, or vice-versa. If the capacity of the first deployment group is determined to be greater than the capacity of the second deployment group, the proxy server may shift the network traffic over from the second deployment group to the first deployment group based on the previous split in the network traffic between the two deployment groups. Conversely, if the capacity of the first deployment group is determined to be less than the capacity of the second deployment group, the proxy server may shift the network traffic from the first deployment group to the second deployment group based on the previous split in the network traffic between the two deployment groups.

As more and more clients come online at the second deployment group for the application update thereby adding capacity, the proxy server may transfer all the network traffic from the first deployment and the second deployment group. Eventually, when the capacity of the second deployment group is at maximum, the proxy server may terminate the first deployment group. By re-allocating the network traffic based on the capacity at each deployment group, the proxy server may allow not only for multiple deployments of application updates to be performed, but also minimize any adverse impact from bringing multiple groups online for the deployments.

Another aspect of this disclosure is directed to a method of provisioning capacity based on network traffic during application update deployments. A deployment proxy having one or more processors may establish a first deployment group of instances for deploying a first application update via a network and a second deployment group of instances for deploying a second application update via the network. The deployment proxy may identify a base capacity of the second deployment group of instances for performing the deployment of the second application update. The deployment proxy may initiate the deployment of the second application update to the second deployment group of instances via the network based on the initial base capacity. The deployment proxy may monitor first network traffic for the deployment of the first deployment group of instances, a second network traffic for the deployment of the second deployment group of instances, and a current capacity of the second deployment group of instances, subsequent to the initiation of the deployment of the second application update at the base capacity. The deployment proxy may control the first network traffic for the deployment of the first application update to the first deployment group of instances and the second network traffic for the deployment of the second application update to the second deployment group of instances based on the current capacity of the second deployment group and on a division of network bandwidth between the first network traffic and the second network traffic.

In some embodiments, the deployment proxy may determine that the current capacity of the second deployment group of instances is greater than a predetermined capacity threshold for initiating routing of the first network traffic to the second deployment group. In some embodiments, controlling the first network traffic and the second network traffic may include routing the first network traffic to the second deployment group responsive to determining that the current capacity of the second deployment group of instances is greater than the predetermine capacity threshold.

In some embodiments, the deployment proxy may determine that the first network traffic for the deployment of the first application update is null and that the second network traffic for the deployment of the second application update is at complete capacity. In some embodiments, the deployment proxy may terminate the first deployment group for the deployment of the first application update responsive to the determination that the first network traffic is null and that the second network traffic is at complete capacity.

In some embodiments, identifying the base capacity for the second deployment may include identifying a number of instances initially operational in the second deployment group, responsive to establishing the second deployment group of instances. In some embodiments, identifying the base capacity for the second deployment may include determining the base capacity for the second deployment group of instances based on the number of instances identified as initially operational in the second deployment group.

In some embodiments, monitoring the first network traffic, the second network traffic, and the current capacity may include detecting a new operational instance in the second deployment group. In some embodiments, controlling the first network traffic and the second network traffic may include routing the first network traffic to the second deployment group of instances, responsive to detecting the new operational instance in the second deployment.

In some embodiments, monitoring the first network traffic, the second network traffic, and the current capacity may include identifying a first throughput of communications in the first network traffic for the first deployment group of instances. The first throughput may include a first set of responses from the deployment proxy and a first set of requests from the first deployment group for the deployment of the first application update. In some embodiments, monitoring the first network traffic, the second network traffic, and the current capacity may include identifying a second throughput of communications in the second network traffic for the second deployment group of instances. The second throughput may include a second set of responses from the deployment proxy and a second set of requests from the first deployment group for the deployment of the second application update. In some embodiments, monitoring the first network traffic, the second network traffic, and the current capacity may include identifying a current number of instances operational in the second deployment group for processing the responses and the requests for the second deployment group.

In some embodiments, controlling the first network traffic and the second network traffic may include initializing an additional instance in the second deployment group based on the division of network bandwidth between the first network traffic and the second network traffic. In some embodiments, controlling the first network traffic and the second network traffic may include routing the first network traffic to the second deployment group based on the second network traffic responsive to initializing the additional instance in the second deployment group.

In some embodiments, establishing the first deployment group of instances may include establishing the first deployment group of instances for deploying the first application update via a first load balancer interfacing with the network. Each instance of the first deployment group may correspond to a respective server. In some embodiments, establishing the second deployment group of instances may include establishing the second deployment group of instances for deploying the second application update via a second load balancer interfacing with the network, each instance of the second deployment group corresponding to a respective server.

In some embodiments, the deployment proxy may receive a request to deploy the second application update to instances. In some embodiments, the deployment proxy may instantiate a load balancer for the second deployment group of instances for the deployment of the second application update.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
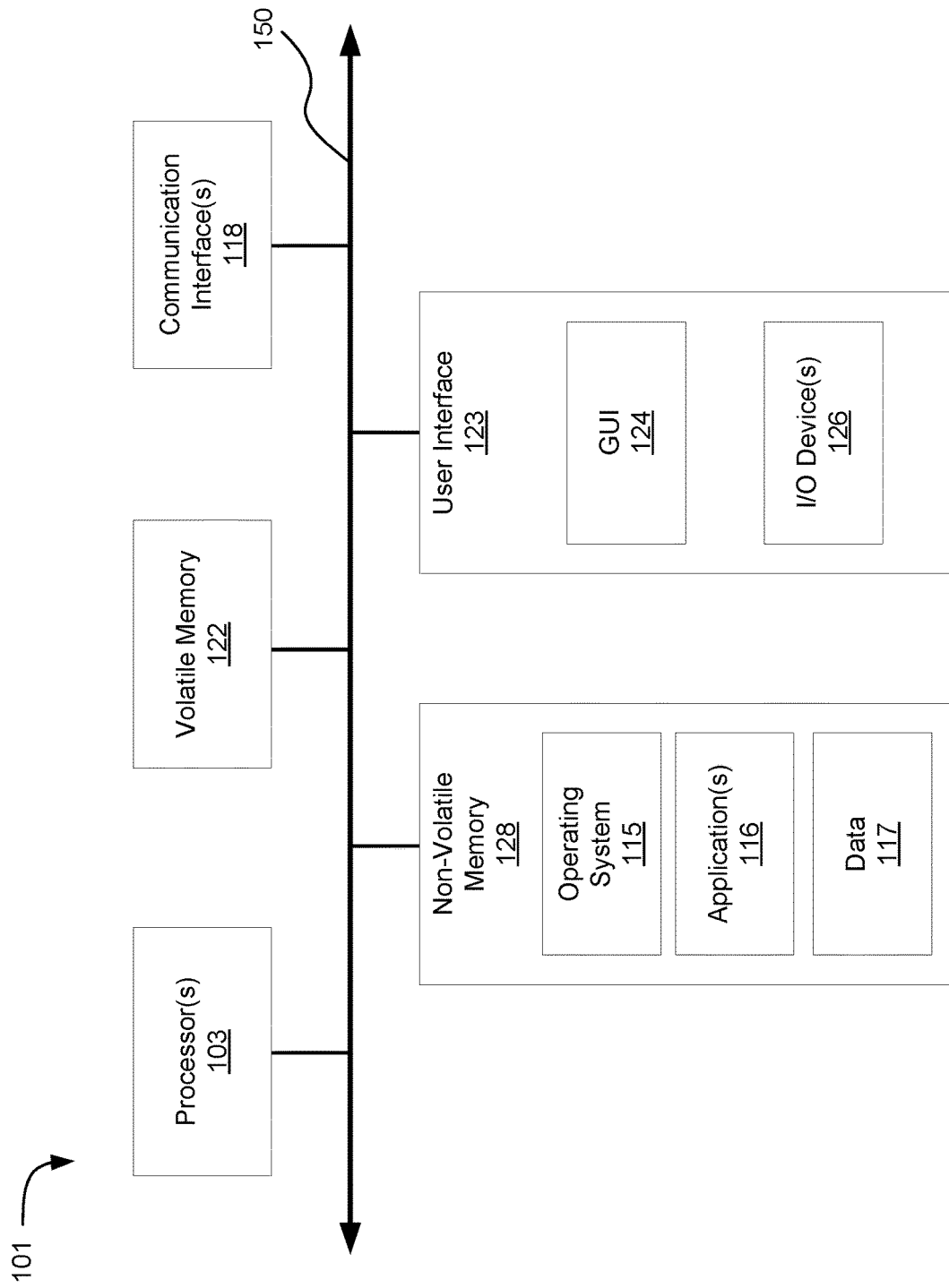
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes systems and methods for allocating cloud resources for application deployments; and Section C describes systems and methods for provisioning capacity based on network traffic during application deployments.

A. Computing Environment

Prior to discussing the specifics of embodiments of the systems and methods detailed herein in Sections B and C, it may be helpful to discuss the computing environments in which such embodiments may be deployed.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Allocating Cloud Resources for Application Deployments

The present disclosure is directed towards systems and methods of allocating cloud resources for application deployments. Cloud-based services (e.g., Infrastructure as a Service (IaaS), Platform as a Service (PaaS), and Software as a Service (SaaS)) may be used to perform deployments of application updates to multiple clients. Software providers may upload application updates onto servers of the cloud-based services to delivery to the multitude of clients. During the course of each deployment, the utilization of cloud resources, such as computer processing power and network bandwidth, may fluctuate. Furthermore, the availability of the cloud resources may also vary, as cloud servers are taken online and offline from the application update deployment. Current cloud-based application delivery platforms, however, may use static allocations of cloud resources, not taking into account of such variabilities in the utilization and the availability of cloud resources in the deployments of the application updates. As such, these variances may lead to suboptimal performance in carrying out the deployments of application updates, such as delays and stoppages of the deployment itself. The reduction in performance in cloud-based application deliveries may be further exacerbated with the increase in the number of clients receiving the application updates.

To address the degradation in performance of the deployments of application updates, the present systems and methods provide a resource capacity model for allocation of cloud resources for application deployments. An application may be deployed in multiple successive environments, such as development, testing, staging, and then production. The staging and production deployment environments may be the most relevant deployment environments. The resource capacity model may be used to allocate cloud resources for the application update deployment in one release environment (e.g., production) using the runtime data during the application update deployment in a previous release environment (e.g., staging).

For constructing the resource capacity model, a resource allocator may first aggregate runtime data from clients of the staging release environment. The aggregated runtime data may include mean values of a computing resource consumption metric (e.g., CPU usage) and a network bandwidth metric (e.g., number of requests) over a predefined sampling interval (e.g., every five minutes). Furthermore, the original samples of the computing resource consumption metric and the network bandwidth metric may not correspond to the same sampling times. To account for the disparity in sampling times, a mean value across the same time frame may be calculated. Additional statistical techniques may be applied to the sampled runtime data for smoothing, such as x-means clustering and outlier filtering. Using the aggregated runtime data, the resource allocator may determine usage of the cloud resources by the clients from the staging release environment. The two metrics may be paired based on the sampling at the predefined interval in the aggregated runtime data.

Using the computing resource consumption metric and the network bandwidth metric of the clients from the staging release environment, the resource allocator may establish the resource capacity model. The resource capacity model may be a linear regression model, with the network bandwidth metric as the explanatory variable ("x") and the computing resource consumption metric as the scalar-dependent variable ("y"). Based on the sampled runtime data, the resource allocator may apply auto-regression techniques to determine the relationship (also referred to as model parameters or regression coefficients) between the network bandwidth metric and the computing resource consumption metric. To account for any discrepancies introduced due to the use of the mean values, the resource allocator may introduce a bias (for example, via standard deviation) into the resource capacity model to predict the actual usage.

With the determination of the relationship between the network bandwidth metric and the computing resource consumption metric, the resource allocator may predict or estimate an allocation of cloud resources for the subsequent production release environment. The relationship between the network bandwidth metric and the computing resource computing metric determined using the runtime data of the staging release environment may be applicable to the relationship of the two metrics in the subsequent production release environment. In general, the production release environment may have a greater number of clients than the number of clients in the staging release environment. The resource capacity model may provide a baseline estimate for the allocation of cloud resources for the production release environment. To account for the greater number of clients in the production release environment, the resource allocator may establish the resource capacity model using the mean value measured from the runtime data. The resource allocator can be configured to predict the resource consumption metric using the resource capacity model because the network bandwidth metric may be known based on production data corresponding to the production release environment. In this way, the resource allocator can use the predicted resource consumption metric (maximum mean value), to estimate the standard deviation of the resource consumption metric. The resource allocator can be configured to estimate different standard deviation values for different scales (for instance, number of clients in the production release environment, number of clients in the staging environment, usage scales, etc.). The resource allocator can be configured to estimate the different standard deviation values from the production data corresponding to the production environment.

From the original sampled data, the resource allocator may then calculate a multiple of standard deviations (e.g., 2σ to 5σ) of a distribution of the original sampled data to predict a usage, for instance, a maximum potential usage of the cloud resources for the production release environment. The predicted maximum usage of the cloud resources may also be at the same predefined sampling interval as the aggregated runtime data.

Using the predicted metrics, the resource allocator may generate instructions for the cloud-based application distribution platform to allocate cloud resources in accordance with the predicted metrics. In addition, while the deployment of the application update to the clients of the production release environment is carried out, the resource allocator can aggregate additional runtime data. The resource allocator can adjust the resource capacity model based on the newly aggregated additional runtime data. With the adjusted resource capacity model, the resource allocator may modify the instructions for the cloud-based application distribution platform to alter the allocation of cloud resources for the application update deployment. To account for any discrepancies introduced due to the use of the mean values, the resource allocator may introduce a bias (for example, via standard deviation) into the resource capacity model to predict the actual usage.

By allocating cloud resources using the resource capacity model in this manner, the resource allocator may improve the allocation of cloud resources from the beginning of and during the application update deployment. Furthermore, dynamically adjusting the resource capacity model may prevent any stoppages or degradation of performance during the deployment of the application update. In addition, the use of runtime data from a prior release environment may allow for integration of A/B testing in application updates.

Figure 2A:
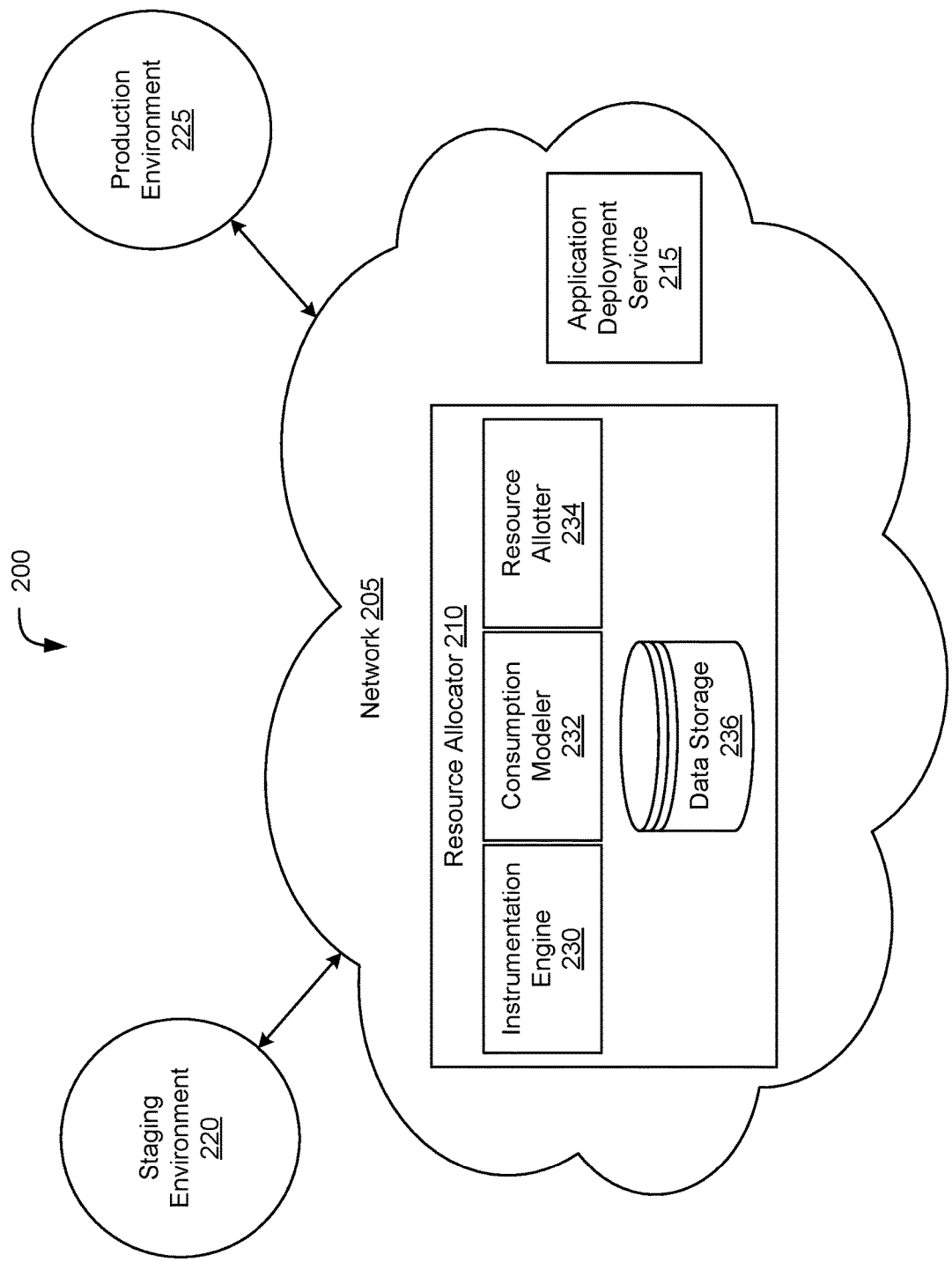
FIG. 2A is a block diagram of an embodiment of a system for allocating cloud resources for application deployments.

Referring now to FIG. 2A, depicted is a block diagram of an embodiment of a system 200 for allocating cloud resources for application deployments. In overview, the system 200 may include a network 205, a resource allocator 210, an application deployment service 215, a staging environment 220, and a production environment 225. The network 205 may be a cloud network, and may include the resource allocator 210 and the application deployment service 215 as cloud computing components, forming a cluster of network elements. The resource allocator 210 may include an instrumentation engine 230, a consumption modeler 232, a resource allotter 234, and data storage 236. In some embodiments, the application deployment service 215 may be a part of the resource allocator 210. The staging environment 220 may include one or more clients (e.g., virtual machine instances). The production environment 225 may include one or more clients (e.g., virtual machine instances).

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the network 205, the resource allocator 210, the application deployment service 215, the clients of the staging environment 220, and the clients of the production environment 225. The hardware includes circuitry such as one or more processors in one or more embodiments.

As context, multiple release environments (sometimes referred to as a software deployment tiers or enterprise deployment) may be used in rolling out an application update. In some embodiments, a multi-tier architecture may be used to deploy the application update, and may include in order: development, testing, staging (e.g., staging environment 220), and production (e.g., production environment 225). In the development environment, the code or computer-executable instructions for the application update may be programmed or composed using a software development kit (SDK). Compiling and initial testing may be performed locally on one or more clients, and consequently the code may be altered in view of the results of the initial testing. Afterwards, in the testing environment, additional testing (e.g., validation, durability, availability, etc.) may be performed with the application update, either automatically or manually with test subjects. The results of the additional testing may be used to make further alterations in the code for the application update for deploying to the staging environment 220 and eventually to the production environment 225.

The staging environment 220 may include one or more clients for installing and running the application update to be deployed to the production environment 225. Staging environment 220 may refer to any release environment prior to the production environment 225. Each client may receive the application update from the application deployment service 215 via the network 205. Within the staging environment 220, final testing of the application update may be performed. Final testing may include performance or load testing to determine various measures of the stability and responsiveness of the application update under various conditions. The conditions may include cloud resources, such as computer processing and network traffic, made available in running the application update, among others. The conditions may be configured such that the staging environment 220 is similar to the production environment 225. While installing and running the application update onto the staging environment, each client of the staging environment 220 may communicate with the application deployment service 215 via the network 205 to exchange requests and responses. The application deployment service 215 and other elements of the network 205 may process requests and responses from the clients of the staging environment 220, thereby consuming cloud resources at the network 205.

The instrumentation engine 230 may calculate, measure, or otherwise identify a computing resource metric and a network traffic metric of the clients of the staging environment 220 for the application update. The computing resource metric and the network traffic metric each may indicate a usage of cloud resources by the clients of the staging environment 220 in connection with the deployment of the application update to the staging environment 220. The computing resource metric may indicate the consumption of processing resources (e.g., CPU usage and memory usage, etc.) and response time, among other metrics, at the application deployment service 215 or other elements in the network 205. The network traffic metric may indicate usage of network bandwidth, data transmission time, and network throughput, among other metrics, between the clients of the staging environment 220 with the application deployment service 215 or the other elements of the network 205. In some embodiments, the network traffic metric may be the number of exchanged requests or responses per a given interval of time.

In identifying the computing resource metric and the network traffic metric, the instrumentation engine 230 may aggregate runtime data from the clients running the application update in the staging environment 220. The runtime data may include measurements of consumption of processing resources, response time, usage of network bandwidth, data transmission time, or network throughput, among other measures in connection with the deployment and running of the application update. In some embodiments, the runtime data may be sampled at a predefined sampling rate, and as such the measurements may be a fixed time intervals. In some embodiments, the runtime data may include Hypertext Transfer Protocol (HTTP) messages to and from the clients of the staging environment 220. In some embodiments, the data storage 236 may include the aggregated runtime data form the deployment and running of the application update in the staging environment 220.

Having aggregated the runtime data, the instrumentation engine 230 may apply extract-transform-load (ETL) onto the aggregated runtime data. In performing the extraction step of the ETL, the instrumentation engine 230 may access the data storage 236 to retrieve the aggregated runtime data. The aggregated runtime data may be stored on the data storage 236 in the form of a relational database. The instrumentation engine 230 may parse the aggregated runtime data stored on the data storage 236. In carrying out the transformation step of ETL, the instrumentation engine 230 may generate a set (e.g., an n-tuple) using the aggregated runtime data at each time interval. The set may include the measured consumption of processing resources, response time, memory consumption, usage of network bandwidth, data transmission time, or network throughput associated at the same sampled time. In some embodiments, the instrumentation engine 230 may generate a pair using the aggregated runtime data interval. The pair may include the computing resource metric (e.g., processing resources, response time, memory consumption, etc.) and the network traffic metric (e.g., usage of network bandwidth, data transmission time, network throughput, etc.). In running the load step of ETL, the instrumentation engine 230 may down-sample the aggregated runtime data to another predefined sampling rate. For example, the aggregated runtime data may originally be sampled at every 15 seconds. In this example, the instrumentation engine 230 may in turn down-sample to every 5 minutes the aggregated runtime data. In some embodiments, the instrumentation engine 230 may apply a signal smoothing algorithm to the aggregated runtime data (e.g., mean normalization).

In addition, the instrumentation engine 230 may apply one or more statistical analysis techniques on the aggregated runtime data (in set form or pair form). The instrumentation engine 230 may perform a clustering algorithm on the aggregated runtime data to identify one or more clusters. The clustering algorithm may be x-means clustering, k-means clustering, expectation-maximization, principal component analysis, and density-based clustering analysis, among others. Each cluster may include a subset of the aggregated runtime data (in set form or pair form). Each cluster may also be associated with a centroid. With each cluster identified, the instrumentation engine 230 may execute an anomaly detection algorithm to identify one or more outliers in the clustered runtime data (in set form or pair form). The anomaly detection algorithm may include k-nearest neighbor or local outlier factor (LOF), among others. For each cluster, the instrumentation engine 230 may calculate a distance between aggregated runtime data (e.g., subsets of sets or pairs) and the associated centroid determined by the clustering algorithm. The distance may include Manhattan distance, Euclidean distance, or Chebyshev distance, among others. For each runtime dataset, the instrumentation engine 230 may compare the distance to a threshold distance. If the distance for the runtime data is greater than or equal to the threshold distance, the instrumentation engine 230 may identify the runtime data as an outlier. On the other hand, if the distance is less than the threshold distance, the instrumentation engine 230 may identify the runtime data as not an outlier. The instrumentation engine 230 may remove or eliminate the runtime data identified as outliers from subsequent processing and analysis.

When the aggregated runtime data includes the HTTP messages, the instrumentation engine 230 may identify a set of HTTP messages match a pre-specified response code (e.g., 100 Continue, 200 OK, 302 Found, etc.). The instrumentation engine 230 may identify a ratio between a number of clients of the staging environment 220 and a number of clients of the production environment 225. The instrumentation engine 230 may sample the set of HTTP messages identified as matching the pre-specified response code based on the ratio between the number of clients in the staging environment 220 versus the number of clients in the production environment 225. In some embodiments, at each sample corresponding to the time interval, the instrumentation engine 230 may compare a number of HTTP messages with the pre-specified response code to a threshold number. The threshold number may be set based on the ratio between the number of clients in the staging environment 220 to the number of clients in the production environment 225. If the number of HTTP messages with the pre-specified response code of the sample is greater than the threshold number, the instrumentation engine 230 may select the HTTP message of the sample for further analysis and processing. Otherwise, if the number of HTTP messages with the pre-specified response code of the sample is less than the threshold number, the instrumentation engine 230 may eliminate or remove the HTTP message from further analysis and processing.

In some embodiments, the instrumentation engine 230 may access an instrumentation service of the staging environment 220 to identify the computing resource metric and the network traffic metric. In some embodiments, the instrumentation service may be Application Insights™ of Microsoft™ Azure™. The instrumentation service may perform similar functionalities as the instrumentation engine 230 in aggregating runtime data and performing various statistical analyses to identify the computing resource metric and the network traffic metric of the clients of the staging environment 220. Once the two metrics are identified, the instrumentation service of the staging environment 220 may provide the computing resource metric and the network traffic metric to the instrumentation engine 230.

Using the computing resource metric and the network traffic metric (as a set or pair) of the clients of the staging environment 220, the consumption modeler 232 may generate a resource capacity model for predicting usage of cloud resources by the clients of the production environment 225. The resource capacity model may be a linear regression model, a logarithmic regression model, a logistic regression model, an artificial neural network, a support vector machine, and Naïve Bayes, among others. In some embodiments, the consumption modeler 232 may use the computing resource metric and the network traffic metric of the clients of the staging environment 220 as inputs to the resource capacity model. In some embodiments, the consumption modeler 232 may use the computing resource metric as an explanatory variable and the network traffic metric as a dependent variable. Upon inputting the computing resource metric and the network traffic metric, the consumption modeler 232 may calculate one or more parameters indicating a correlation between the computing resource metric and the network traffic metric. The calculation may be performed via auto-regression, training, and other statistical techniques. In some embodiments, at least one of the parameters may represent a noise factor in the resource capacity model. For example, the resource capacity model may be a linear regression model in the form:

$$y = k \cdot x + b$$

where y is the dependent variable and may be the computing resource metric of the clients of the staging environment 220, x is the explanatory variable and may be the network traffic metric of the clients of the staging environment 220, and k and b are the parameters of linear regression calculated via auto-regression.

From the resource capacity model, the consumption modeler 232 may apply transfer learning to calculate or determine a predicted computing resource metric and a network traffic metric for the clients of the production environment 225. In some embodiments, the consumption modeler 232 may calculate the predicted computing resource metric and the network traffic metric for the clients of the production environment 225. In some embodiments, the network traffic metric for the clients of the production environment 225 may be pre-set or predetermined based on a number of clients in the production environment 225. Using the predetermined network traffic metric and resource capacity model, the consumption modeler 232 may calculate the predicted computing resource metric for the clients of the production environment 225. In some embodiments, the consumption modeler 232 may determine a distribution of the computing resource metrics and the network traffic metrics of the clients of the staging environment 220 using the resource capacity model. The distribution may be n-dimensional, with each dimension representing consumption of processing resources, response time, memory consumption, usage of network bandwidth, data transmission time, or network throughput associated at the same sampled time.

The consumption modeler 232 may calculate a mean value and a standard deviation of the computing resource metric and the network traffic metric for the clients of the staging environment 220. The consumption modeler 232 may calculate a product of the standard deviation with a security level factor as the predicted, maximum computing resource metric or the network traffic metric for the clients of the production environment 225 in connection with the deployment of the application update. The security level factor may be set based on a number of clients in the production environment 225 versus a number of clients in the staging environment 220. The maximum computing resource metric and network traffic metric may be, for example, in the form:

$$y = \mu + c \cdot \sigma$$

where y is the predicted, maximum computing resource metric or network traffic metric for the production environment 225, μ is the mean value of the computing resource metric or network traffic metric for the staging environment 220, σ is the standard deviation of the computing resource metric or network traffic metric for the staging environment 220, and c is the security level factor. In this manner, the security level factor may take into account additional consumption of cloud computing resources at the network 205 due to the discrepancy in size between the number of clients in the staging environment 220 and the production environment 225. In some embodiment, the security factor may range from 3 to 7. In some embodiments, the consumption modeler 232 may calculate the predicted, maximum computing resource metric and the network traffic metric for the clients of the production environment 225 over time.

Based on the predicted computing resource metric and the network traffic metric for the clients of the production environment 225, the resource allotter 234 may generate instructions to set an allocation of cloud resources for performing the deployment of the application update. The instructions may include a deployment schedule for the clients of the production environment 225 to be performed by the application deployment service 215. In some embodiments, the deployment schedule may specify an allocation of the computing resources and network bandwidth at the network 205 or the application deployment service 215 at specified times. The resource allotter 234 may traverse through the predicted, maximum computing resource metric and the network traffic metric at each time, and may generate an instruction for allocation of cloud resources at the corresponding time. Once the instructions are generated, the resource allotter 234 may provide the instructions to the application deployment service 215 via the network 205.

Upon receipt of the instructions generated by the resource allotter 234, the application deployment service 215 may execute the instructions to set the allocation of cloud resources to perform the deployment of the application update to the clients of the production environment 225. In some embodiments, the application deployment service 215 may modify or change the allocation of cloud resources in accordance with the instructions. In some embodiments, the application deployment service 215 may wait the execution of the instructions until receipt of a request to initiate deployment of the application update to the clients of the production environment 225 from an administrator.

While deploying the application update to the clients of the production environment 225, various functionalities of the resource allocator 210 may be repeated using runtime data from the clients of the production environment 225. As the deployment of the application update is performed, the instrumentation engine 230 may identify a measured computing resource metric and a network traffic metric of the clients of the production environment 225 in connection with the deployment. In identifying the measured computing resource metric and the network traffic, the instrumentation engine 230 may aggregate runtime data from the clients running the application update in the production environment 225. The instrumentation engine 230 may apply ETL and statistical analysis techniques on the aggregated runtime data from the production environment 225, in a similar manner as detailed above.

The consumption modeler 232 in turn may modify or later the resource capacity model based on the measured computing resource metric and the network traffic metric during the deployment of the application update to the production environment 225. In some embodiments, the consumption modeler 232 may calculate a difference between the measured computing metric and the predicted computing metric and a difference between the measured network traffic metric and the predicted computing metric across the sampled times. In some embodiments, the consumption modeler 232 may determine a trend from the measured computing resource metrics and the network traffic metrics across time. The trend may indicate whether more or less of the cloud resources are utilized over time. In some embodiments, the consumption modeler 232 may adjust the resource capacity model based on the two differences and the trend. If the difference is positive indicating that the cloud resources are under-utilized and the trend is increasing, the consumption modeler 232 may maintain the resource capacity model. If the difference is positive indicating that the cloud resources are under-utilized and the trend is decreasing, the consumption modeler 232 may decrease the predicted computing resource metric and network traffic metric. If the difference is negative indicating that the cloud resources are over-utilized and the trend is increasing, the consumption modeler 232 may increase the predicted computing resource metric and network traffic metric. If the difference is negative indicating that the cloud resources are over-utilized and the trend is decreasing, the consumption modeler 232 may maintain the resource capacity model.

Using the updated resource capacity model, the resource allocator 234 may generate instructions to set an adjusted allocation of cloud resources for performing the deployment of the application update. The instructions may include a new deployment schedule for the clients of the production environment 225 to be performed by the application deployment service 215. If the resource capacity model is updated to increase the predicted computing resource metric and the network traffic metric, the instructions may specify a higher allocation of the respective cloud resources. Conversely, if the resource capacity model is updated to decrease the predicted computing resource metric and the network traffic metric, the instructions may specify a lower allocation of the respective cloud resources. Once the instructions are generated, the resource allotter 234 may provide the instructions to the application deployment service 215 via the network 205. Upon receipt of the updated instructions generated by the resource allotter 234, the application deployment service 215 may modify or change the allocation of cloud resources in accordance with the instructions.

Figure 2B:
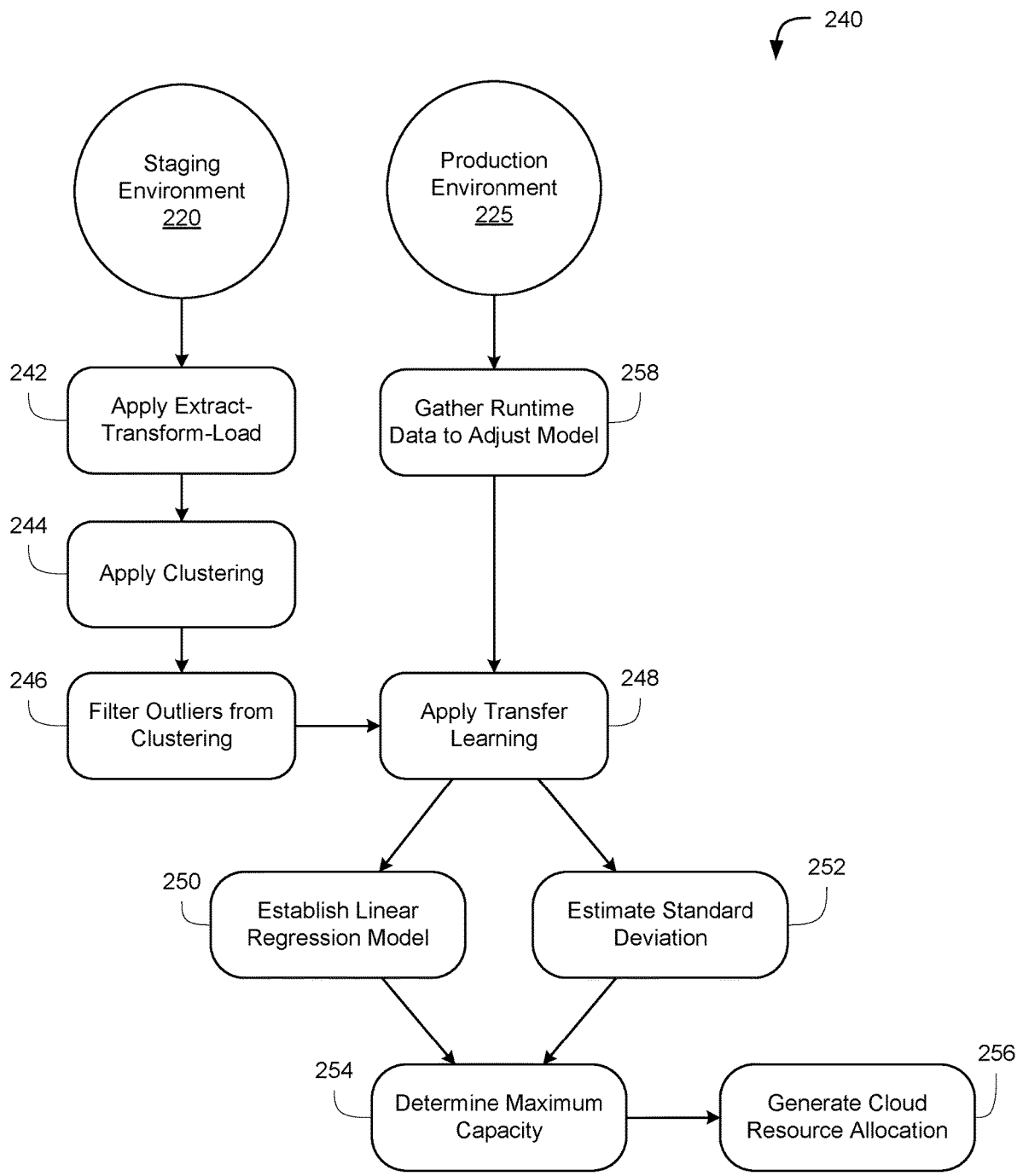
FIG. 2B is a sequence diagram of an embodiment of a system for allocating cloud resources for application deployments.

Referring now to FIG. 2B, depicted is a sequence diagram of a process 240 for allocating cloud resources for application deployments. The operations and functionalities of the process 240 may be performed by the components described in FIG. 1 and FIG. 2A, the system 100, and/or the system 200 detailed above. A resource allocator may apply extract-transform-load (ETL) onto runtime data aggregated from the staging environment 220 (242). In applying ETL, the resource allocator may generate pairs of computing resource metrics and network traffic metrics. The resource allocator may apply clustering to the aggregated runtime data (244). The resource allocator may filter outliers from the clustered runtime data (246). The resource allocator may apply transfer learning to calculate predicted computing resource metrics and network traffic metrics for the production environment 225 in connection with the deployment of the application update (248). The resource allocator may establish a linear regression model using the runtime data of the staging environment 220 (250). The resource allocator may in parallel estimate a standard deviation of the runtime data (252). Using the linear regression model and the standard deviation, the resource allocator may determine a maximum capacity of cloud resources for deploying the application update to the production environment 225 (254). The resource allocator may generate instructions for cloud resource allocation using the determined maximum capacity of cloud resources (256). Subsequently, the resource allocator may gather runtime data from the production environment 225 to adjust the linear regression model and the instructions for cloud resource allocation (258).

Figure 2C:
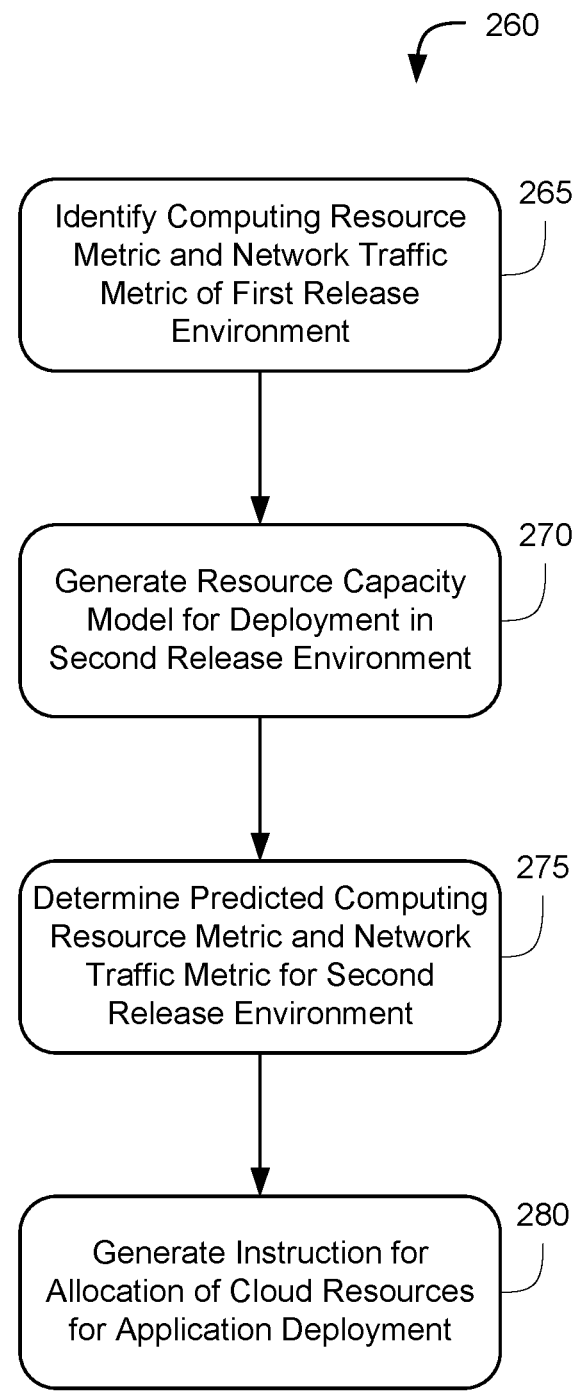
FIG. 2C is a flow diagram of an embodiment for a method of allocating cloud resources for application deployments.

Referring now to FIG. 2C, depicted is a flow diagram of an embodiment of a method 260 allocating cloud resources for application deployments. The operations and functionalities of the method 260 may be performed by the components described in FIG. 1 and FIG. 2A, the system 100, and/or the system 200 detailed above. In brief overview, a resource allocator may identify a computing resource metric and a network traffic metric of a first release environment (265). The resource allocator may generate a resource capacity model for deployment of the application update in a second release environment (270). The resource allocator may determine a predicted computing resource metric and network traffic metric for the second release environment using the resource capacity model (275). The resource allocator may generate instructions for allocation of cloud resources for deployment of the application update to the second release environment (280).

In further detail, a resource allocator may identify a computing resource metric and a network traffic metric of a first release environment (265). The resource allocator may aggregate runtime data from clients of the first release environment in connection with the deployment of the application update. The runtime data may include measurement of consumption of processing resources, response time, memory consumption, usage of network bandwidth, data transmission time, or network throughput at a predefined time interval. The resource allocator may apply extract-transform-load and various statistical analysis techniques on the aggregated runtime data. The resource allocator may generate a data pair with the computing resource metric (e.g., consumption of processing resources, response time, memory consumption, etc.) and the network traffic metric (e.g., usage of network bandwidth, data transmission time, network throughput, etc.).

The resource allocator may generate a resource capacity model for deployment of the application update in a second release environment (270). The resource allocator may use the identified computing resource metric and the network traffic metric from the first release environment as inputs of the resource capacity model. In some embodiments, the resource capacity model may be a linear regression model, with the computing resource metric as an explanatory variable and the network traffic metric as a dependent variable. The resource allocator may calculate other parameters in the resource capacity model to relate the computing resource metric to the network traffic metric.

The resource allocator may determine a predicted computing resource metric and network traffic metric for the second release environment using the resource capacity model (275). The resource allocator may calculate a mean value and a standard deviation of the computing resource metric and the network traffic metric from the resource capacity model. The resource allocator may calculate a product of the standard deviation with a security level factor as the predicted, maximum computing resource metric and the network traffic metric for the clients of the second release environment for the deployment of the application update.

The resource allocator may generate instructions for allocation of cloud resources for deployment of the application update to the second release environment (280). Based on the predicted, maximum computing resource metric and the network traffic metric, the resource allocator may generate a deployment schedule for performing the deployment of the application update. The deployment schedule may specify an allocation of the computing resources and network bandwidth by the application deployment service in carrying out the deployment of the application update to the second release environment.

C. Provisioning Capacity Based on Network Traffic During Application Deployments The present disclosure is further directed towards provisioning capacity based on network traffic during application deployments. As discussed above, cloud-based services (e.g., Infrastructure as a Service (IaaS), Platform as a Service (PaaS), and Software as a Service (SaaS)) may be used to perform deployments of application updates to multiple clients. Software providers may upload application updates onto servers of the cloud-based services to delivery to the multitude of clients. During the course of each deployment, the utilization of cloud resources, such as computer processing power and network bandwidth, may fluctuate. Furthermore, the availability of the cloud resources may also vary, as cloud servers are taken online and offline from the application update deployment. Current cloud-based application delivery platforms, however, may use static or fixed allocations of cloud resources, not taking into account of such variabilities in the utilization and the availability of cloud resources during the deployments of the application updates. To the extent that cloud resources are pre-allocated, such allocations of cloud resources in current techniques may take machine utilization, not network bandwidth usage, into consideration. As such, these variances may lead to suboptimal performance in carrying out the deployments of application updates, such delays and stoppages of the deployment. The reduction in performance in cloud-based application deliveries may be further exacerbated with the increase in the number of clients receiving the application updates.

To address the fluctuations in the utilization and availability of cloud resources during deployments of application updates, the present systems and methods provide a proxy server to control network traffic for delivering application updates to deployment groups. Different versions of the application may be rolled out to a multiple deployment groups of clients (e.g., virtual machine instances) from an application update provider via the proxy server. A first deployment group of clients may have been established for the deployment a first version of the application. Each client may be in communication with the proxy server in connection with the deployment of the first version of the application exchanging requests and responses. When a second version of the application is to be rolled out, a second deployment group of clients may be established for carrying out the deployment.

With the establishment of the second deployment group, the proxy server may first calculate a base capacity of the second deployment group of clients to optimally allocate the network traffic across the two deployment groups. The base capacity may correspond to to number of clients initially in the second deployment group, and may correlate to the network throughput that the second deployment group can initially handle. In general, the second deployment group of clients may initially number less than the first deployment group of clients. Based on the base capacity, the proxy server may initialize deployment the second version of the application to the second deployment group, while maintaining the deployment of the first version to the first deployment group. As with the clients of the first deployment group, the clients of the second deployment group may communicate with the proxy server for exchanging requests and responses in connection with the deployment of the second version. From this point onward, the proxy server may monitor the network traffic between the proxy server itself and the first deployment group and the network traffic between the proxy server itself and the second deployment group.

As additional clients are brought online into the second deployment group (e.g., by instantiating new virtual machine instances), the utilization of network traffic between the proxy server and the second deployment group may alter. The proxy server may detect the change in utilization of network traffic, from monitoring the utilization of network traffic and capacity at each deployment group. The proxy server may measure the network traffic at each deployment group as the network throughput per a number of requests. The proxy server may also calculate a current capacity of each deployment group based on the number of instances in the respective deployment group. Based on the split of network traffic and the capacity of each deployment group, the proxy server may re-allocate or shift network traffic from the first deployment group to the second deployment group, or vice-versa. If the capacity of the first deployment group is determined to be greater than the capacity of the second deployment group, the proxy server may shift the network traffic over from the second deployment group to the first deployment group based on the previous split in the network traffic between the two deployment groups. Conversely, if the capacity of the first deployment group is determined to be less than the capacity of the second deployment group, the proxy server may shift the network traffic from the first deployment group to the second deployment group based on the previous split in the network traffic between the two deployment groups.

As more and more clients come online at the second deployment group for the application update thereby adding capacity, the proxy server may transfer all the network traffic from the first deployment and the second deployment group. Eventually, when the capacity of the second deployment group is at maximum, the proxy server may terminate the first deployment group. By re-allocating the network traffic based on the capacity at each deployment group, the proxy server may allow not only for multiple deployments of application updates to be performed, but also minimize any adverse impact from bringing multiple groups online for the deployments.

Figure 3A:
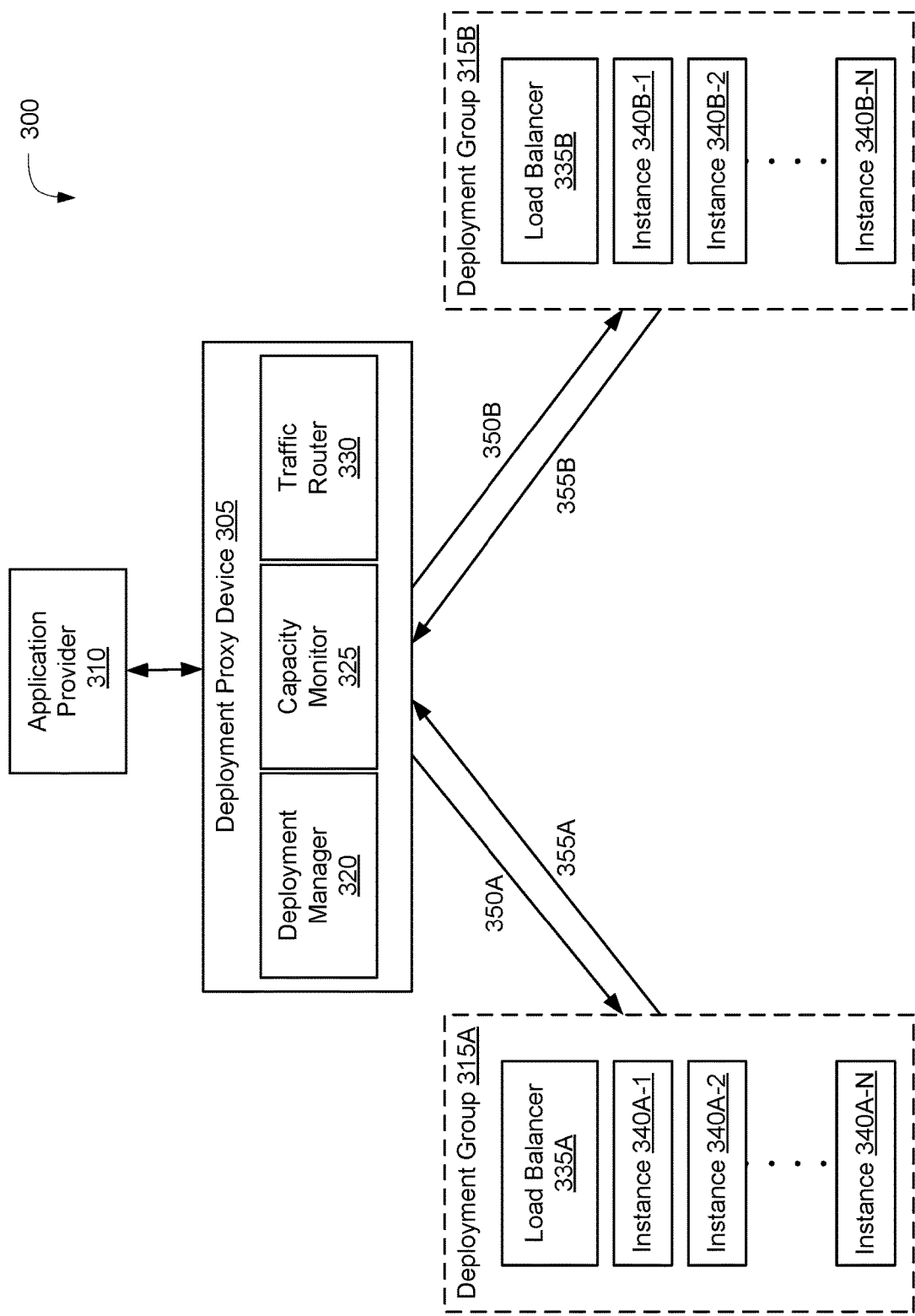
FIG. 3A is a block diagram of an embodiment of a system for provisioning capacity based on network traffic during application deployments.

Referring now to FIG. 3A, depicted is a block diagram of an embodiment of a system 300 for provisioning capacity based on network traffic during application deployments. In overview, the system 300 may include a deployment proxy device 305 and an application provider 305. The deployment proxy device 305 may include a deployment manager 320, a capacity monitor 325, and a traffic router 330, among others. The system 300 may also initially include a first deployment group 315A and later instantiate a second deployment group 315B as detailed below. The first deployment group 315A may include a load balancer 335A and one or more instances 340A-1 to 340A-N (hereinafter generally referred to as instance(s) 340A). The second deployment group 315B may include a load balancer 335B and one or more instances 340B-1 to 340B-N (hereinafter generally referred to as instance(s) 340B). Each load balancer 335A or 335B may correspond to a virtual machine instance or a virtual server instance, among others. Each instance 340A or 340B may correspond to a client, a virtual machine instance, or a virtual server instance among others. Each component of system 300 may be in communication with one another via a network.

Each of the above-mentioned elements or entities is implemented in hardware, or a combination of hardware and software, in one or more embodiments. Each component of the system 300 may be implemented using hardware or a combination of hardware or software detailed above in connection with FIG. 1. For instance, each of these elements or entities can include any application, program, library, script, task, service, process or any type and form of executable instructions executing on hardware of the deployment proxy device 305, the application update provider 310, and the deployment groups 315A and 315B. The hardware includes circuitry such as one or more processors in one or more embodiments.

The application provider 310 may provide one or more application updates to provide to instances 340A or 340B via the deployment proxy device 305. The application provider 310 may receive a command to deploy an application update from an administrator. The command may specify a version of an application to deploy to the instances 340A or 340B via the deployment proxy device 305, and ultimately to the end users of the application update. Upon receipt of the command, the application provider 310 may send a request to deploy the application update to the deployment manager 320 of the deployment proxy device 305. The request may include the command, and may likewise specify the version of the application to deploy to the instances 340A or 340B. In some embodiments, the request to deploy may include the application update itself.

When the request to deploy to an application update is received, the deployment manager 320 may establish one or more deployment groups of instances for deploying application updates. Initially, there may be one deployment group (e.g., the first deployment group 315A) in communication with the deployment manager 320 in connection with the deployment of the application updates. The deployment manager 320 may establish the first deployment group 315A for deploying a first application update. The first application update may correspond to a first version of an application. In some embodiments, the deployment manager 320 may instantiate one or more instances 340A in the first deployment group 315A. Initially, there may be at least one instance 340A in the first deployment group 315A, and additional instances 340A may be brought online or instantiated during the deployment of the first application update. Each instance 340A may correspond to a virtual machine running on physical hardware. In some embodiments, the deployment manager 320 may instantiate a load balancer 335A for the first deployment group 315A for the deployment of the first application update. The load balancer 335A may distribute an amount of data flowing between the first deployment group 315A and the deployment manager 320 among the instances 340A.

Upon establishment of the first deployment group 315A, the deployment manager 320 may provide the first application update to each instance 340A of the first deployment group 315A. In some embodiments, the deployment manager 320 may provide the first version of the application to each instance 340A of the first deployment group 315A. In performing the deployment of the first application update, the instances 340A of the first deployment group 315A may receive messages 350A (e.g., responses) from the deployment proxy device 305 and send messages 355A (e.g., requests) to the deployment proxy device 305. Each message 350A and 355A may be in accordance with any number of communication protocols, such as the Hypertext Transfer Protocol (HTTP) or the Transport Layer Security (TLS), among others. Upon instantiation, each instance 340A may send a communication initiation message (e.g., message 355A) to commence a communication session between the instance 340A and the deployment manager 320. The communication session may be in accordance with any number of communication protocols, such as the Hypertext Transfer Protocol (HTTP) or the Transport Layer Security (TLS), among others. In some embodiments, the load balancer 335A may send the initiation message to commence the communication session on behalf of the instance 340A.

During the deployment of the first application update to the first deployment group 315A, the capacity monitor 325 may monitor network traffic between the first deployment group 315A and the deployment proxy device 305. The exchanged messages 350A and 355A in connection with the deployment of the first application update may constitute network traffic between the first deployment group 315A and the deployment manager 320. In some embodiments, the capacity monitor 325 may identify data throughput of the network traffic between the first deployment group 315A and the deployment manager 320. The data throughput may correspond to an amount of data exchanged via the messages 350A and 355A between the instances 340A of the first deployment group 315A and the deployment manager 320, and may be measured in bits per unit of time.

In addition, the capacity monitor 325 may monitor a capacity of the first deployment group 315A. The capacity for the first deployment group 315A may be based on or correlate with a number of operational instances 340A in the first deployment group 315A. To identify the number of operational instances 340A, the capacity monitor 325 may parse the messages 350A and 355A. In some embodiments, a subset of the messages 350A and 355A may be heartbeat packets. For messages 350A sent to the instances 340A, the capacity monitor 325 may count a number of different destination identifiers (e.g., Internet Protocol (IP) or Media Access Control (MAC) addresses or other device identifiers)

throughout the messages 350A. For messages 355A received from the instances 340A, the capacity monitor 325 may count a number of different source identifiers (e.g., IP or MAC addresses or device identifiers) throughout the messages 355A. Based on the number different destination or source identifiers, the capacity monitor 325 may determine the number of operational instances 340A. Using the number of operational instances 340A, the capacity monitor 325 may estimate the capacity for the first deployment group 315A based on a predefined computing resource measure (e.g., processing power and memory capacity, etc.) for each instance 340A. In some embodiments, the capacity monitor 325 may send a request to the load balancer 335A for the number of operational instances 340A, and in turn receive the number of operational instances 340A from the load balancer 335A.

The deployment manager 320 may continue to deploy the application update to the first deployment group 315A. In some embodiments, the deployment manager 320 may instantiate additional instances 340A in the first deployment group 340A based on a progress of the first application update. In some embodiments, the deployment manager 320 may determine the progress of the first application update based on content of messages 350A and 355A (e.g., the body content). The deployment manager 320 may compare the determined progress to one or more ranges of progression. Based on which range of progression the determined progress matches, the deployment manager 320 may instantiate instances 340A in the first deployment group 315A. In some embodiments, the load balancer 335A may instantiate the additional instances 340A in the first deployment group 315A based on the progress of the application update. Subsequently, the deployment manager 320 may detect the instantiation of the new additional instances 340A in the first deployment group 315A. Conversely, a previously operational instance 340A in the first deployment group 315A may become inoperative for any number of reasons (e.g., failure, taken offline, etc.), thereby decreasing the capacity of the first deployment group 315A. The deployment manager 320 may detect the previously operational instance 340A becoming inoperative. Each time a previously operational instance 340A is detected as becoming inoperative, the capacity monitor 325 may determine the current capacity of the first deployment group 315A.

With the deployment of the first application update progressing, the capacity monitor 325 may continue to monitor the network traffic between the first deployment group 315A and the deployment manager 320, and may monitor the capacity of the first deployment group 315A, using the techniques detailed above. The capacity monitor 320 may provide the network traffic and the capacity of the first deployment group 315A to the application provider 310. Gradually, with the number of instances 340A brought online or instantiated, the first deployment group 315A may reach complete capacity. In some embodiments, the capacity monitor 325 may determine that the first deployment group 315A has reached complete capacity, when the number of operational instances 340A is at a predetermined number. In response, the capacity monitor 320 may provide a notification of maximum capacity of the first deployment group 310A to the application provider 310.

At this point, the application provider 310 may send another request to deploy a second application update to end users. The request may be sent in accordance with a command to provide the second application update to the end users. In some embodiments, the application provider 310 may receive another command to deploy the application update from an administrator. The request may specify that the deployment proxy device 305 is to provide the second version of the application to the instances 340A or 340B. In some embodiments, the request to deploy may include the second application update itself.

Upon receipt of the second request to deploy the second application update, the deployment manager 320 may establish the second deployment group 315B for deploying the second application update. The second application update may correspond to the second version of the application update, such as a newer version of the application. In some embodiments, the deployment manager 320 may instantiate one or more instances 340B in the second deployment group 315B. Initially, there may be at least one instance 340B in the second deployment group 315B, and additional instances 340B may be brought online or instantiated during the deployment of the second application update. Each instance 340B may correspond to a virtual machine running on physical hardware. In some embodiments, the deployment manager 320 may instantiate a load balancer 335B for the second deployment group 315B for the deployment of the application update. The load balancer 335B may distribute an amount of data flowing between the second deployment group 315B and the deployment manager 320 among the instances 340B. Upon instantiation, each instance 340B may send an initiation message (e.g., message 355B) to commence a communication session between the instance 340B and the deployment manager 320. The communication session may be in accordance with any number of communication protocols, such as the Hypertext Transfer Protocol (HTTP) or the Transport Layer Security (TLS), among others. In some embodiments, the load balancer 335B may send the initiation message to commence the communication session on behalf of the instance 340B.

With the establishment of the second deployment group 315B, the capacity monitor 325 may calculate, estimate, or otherwise identify a base capacity of the second deployment group 315B. As discussed above, initially there may be less than a complete set of instances 340B in the second deployment group 315B, and additional instances 340B may be created at a later time in the deployment of the application update. The base capacity for the second deployment group 315B may be based on or correlate with an initial number of operational instances 340B in the second deployment group 315B. The capacity monitor 325 may identify the initial number of operational instances 340B of the second deployment group 315B. To identify the initial number of operational instances 340B, the capacity monitor 325 may parse the initiation message for commencing the communication session between the instance 340B and the deployment manager 320. The initiation message may include a source identifier (e.g., Internet Protocol (IP) or Media Access Control (MAC) addresses or other device identifiers) corresponding to the instance 340B. The capacity monitor 325 may count a number of different source identifiers. Based on the number of different source identifiers, the capacity monitor 325 may identify the initial number of operational instances 340B. Using the initial number of operational instances 340B, the capacity monitor 325 may estimate the base capacity for the second deployment group 315B based on a predefined computing resource measure (e.g., processing power and memory capacity, etc.) for each instance 340B.

In accordance with the base capacity of the second deployment group 315B, the deployment manager 320 may initiate the deployment of the second application update to each instance 340B of the second deployment group 315B.

The deployment manager 320 may provide the second application update to the instances 340B of the second deployment group 315B, while continuing to provide the first application update to the instances 340A of the first deployment group 315A. In some embodiments, the deployment manager 320 may provide the second version of the application to each instance 340B of the second deployment group 315B. In performing the deployment of the second application update, the instances 340B of the second deployment group 315B may receive messages 350B (e.g., responses) from the deployment proxy device 305 and send messages 355B (e.g., requests) to the deployment proxy device 305. Each message 350B and 355B may be in accordance with any number of communication protocols, such as the Hypertext Transfer Protocol (HTTP) or the Transport Layer Security (TLS), among others.

In addition, the traffic router 330 may initially set or transfer a predefined amount of the network traffic from the first deployment group 315A to the second deployment group 315B based on the base capacity of the second deployment group 315B. There may be a finite amount of network bandwidth between the deployment manager 320 and any other element connected via the network. In some embodiments, the predefined amount may correlate with the initial number of operational instances 340B. In some embodiments, the predefined amount may correspond to a predetermined amount of network bandwidth for messages 350B and 355B exchanged between the instances 340B of the second deployment group 315B and the deployment manager 320. In some embodiments, the predefined amount may be based on a difference between the number of operational instances 340A in the first deployment group 315A and the number of operational instances 340B in the second deployment group 315B. In some embodiments, the traffic router 330 may initially set or transfer the predefined amount of network throughput from the network traffic between the first deployment group 315A and the deployment manager 320 to the network traffic between the second deployment group 315B and the deployment manager 320. In some embodiments, the traffic router 330 may initiate the transfer of the predefined amount of network traffic, when the capacity of the second deployment group 315B is greater than a predetermined capacity threshold. The predetermined capacity threshold may correspond to an amount of capacity for initiating the routing of network traffic from the first deployment group 315A to the second deployment group 315B. Since the instances 340A of the first deployment group 315A are further along in the deployment of the first application update, network bandwidth may be transferred from the first deployment group 315A to the second deployment group 315B without any adverse impacts onto either deployment of the application updates.

During the deployment of the first application update and the second application update, the capacity monitor 325 may monitor network traffic between the second deployment group 315B and the deployment proxy device 305. The capacity monitor 325 may continue to monitor the network traffic between the first deployment group 315A and the deployment proxy device 305. The exchanged messages 350B and 355B in connection with the deployment of the second application update may constitute network traffic between the second deployment group 315B and the deployment manager 320. In some embodiments, the capacity monitor 325 may identify data throughput of the network traffic between the second deployment group 315B and the deployment manager 320. The data throughput may correspond to an amount of data from the messages 350B and 355B exchanged between the instances 340B of the second deployment group 315B and the deployment manager 320, and may be measured in bits per unit of time.

As the deployment of the second deployment update progresses, the capacity monitor 325 may continue to monitor a current capacity of the second deployment group 315B. The capacity for the second deployment group 315B may be based on or correlate with a current number of operational instances 340B in the second deployment group 315B. To identify the number of operational instances 340B, the capacity monitor 325 may parse the messages 350B and 355B. In some embodiments, a subset of the messages 350B and 355B may be heartbeat packets. For messages 350B sent to the instances 340B, the capacity monitor 325 may count a number of different destination identifiers (e.g., Internet Protocol (IP) or Media Access Control (MAC) addresses or other device identifiers) throughout the messages 350B. For messages 355B received from the instances 340B, the capacity monitor 325 may count a number of different source identifiers (e.g., IP or MAC addresses or device identifiers) throughout the messages 355B. Based on the number different destination or source identifiers, the capacity monitor 325 may determine the initial number of operational instances 340B. Using the number of operational instances 340B, the capacity monitor 325 may estimate the capacity for the second deployment group 315B based on a predefined computing resource measure (e.g., processing power and memory capacity, etc.) for each instance 340B. In some embodiments, the capacity monitor 325 may send a request to the load balancer 335B for the number of operational instances 340B, and may in turn receive the number of operational instances 340B from the load balancer 335B for the second deployment group 315B.

The deployment manager 320 may continue to deploy the second application update to the second deployment group 315B. In some embodiments, the deployment manager 320 may instantiate additional instances 340B in the second deployment group 340B based on a progress of the second application update. In some embodiments, the deployment manager 320 may determine the progress of the second application update based on content of messages 350B and 355B (e.g., the body content). The deployment manager 320 may compare the determined progress to one or more ranges of progression. Based on which range of progression the determined progress matches, the deployment manager 320 may instantiate additional instances 340B in the second deployment group 315B, thereby increasing the capacity of the second deployment group 315B. In some embodiments, the load balancer 335B may instantiate the additional instances 340B in the second deployment group 315B using the same conditions as the deployment manager 320 in instantiating additional instances 340B. Subsequently, the deployment manager 320 may detect the instantiation of the new additional instances 340B in the second deployment group 315B. Conversely, a previously operational instance 340B in the second deployment group 315B may become inoperative for any number of reasons (e.g., failure, taken offline, etc.), thereby decreasing the capacity of the second deployment group 315B. The deployment manager 320 may detect the previously operational instance 340B becoming inoperative. Each time a previously operational instance 340B is detected as becoming inoperative, the capacity monitor 325 may determine the current capacity of the second deployment group 315B.

Based on the measurements of the network traffic from the first deployment group 315A and from the second deployment group 315B and the capacity of the second deployment group, the traffic router 330 may control the network traffic originating from the deployment manager 320 in connection with the two application updates. In some embodiments, the traffic router 330 may control or adjust the network traffic from the first deployment group 315A and the network traffic from the second deployment group 315B, in response to detecting an additional instance 340B coming online or a previously operational instance 340B becoming inoperative. The traffic router 330 may determine a division of the network bandwidth between the network traffic between the deployment manager 320 and the first deployment group 315A and the network traffic between the deployment manager 320 and the second deployment group 315B. In some embodiments, the traffic manager 330 may calculate a ratio, quotient, or division of the network bandwidth, using the data throughput from the first deployment group 315A and the data throughput from the second deployment group 315B. Based on the division of network traffic and the current capacity of the deployment groups 315A and 315B, the traffic manager 330 may route the network traffic, such that eventually all network traffic is directed to the second deployment group 315B with the second application update.

With additional instances 340B coming online at the second deployment group 315B, the traffic manager 330 may adjust the network bandwidth between the first deployment group 315A and the second deployment group 315B accordingly. The traffic manager 330 may also compare the capacity of the first deployment group 315A with the capacity of the second deployment group 315B. The comparison may be further based on a predetermined margin of network traffic. The predetermined margin of capacity may mark an amount of capacity at which to shift or route more network traffic away from one deployment group 315A or 315B to the other deployment group 315B or 315A respectively. If the capacity of the first deployment group 315A exceeds the capacity of the second deployment group 315B by the predetermined margin, the traffic router 330 may maintain the network traffic (or network bandwidth) at the first deployment group 315A and the second deployment group 315B. In some embodiments, if the capacity of the second deployment group 315B does not exceed and the capacity of the first deployment group 315A and has decreased due to a previously operational instance 340B becoming inoperative, the traffic router 330 may route network traffic (or network bandwidth) from the second deployment group 315A to the first deployment group 315B. Conversely, if the capacity of the second deployment group 315B exceeds the capacity of the first deployment group 315A by the predetermined margin, the traffic router 330 may route the network traffic from the first deployment group 315A to the second deployment group 315B.

In turn, with the shifting of the network traffic between the first deployment group 315A and the second deployment group 315B, the deployment manager 320 may instantiate additional instances 340B to the second deployment group 315B based on the network traffic from the deployment manager 320. The number of operational instances 340A and 340B in each deployment group 315A or 315B may be based on a ratio of the network traffic at each deployment group 315A or 315B. In some embodiments, the deployment manager 320 may instantiate additional instances 340B in the second deployment group 315B based on the division of network bandwidth between the first deployment group 315A and the second deployment group 315B. In addition, the deployment manager 320 may terminate instances 340A in the first deployment group 315A based on the division of the network bandwidth between the first deployment group 315A and the second deployment group 315B. While various instances 340A or 340B are instantiated and terminated, the deployment manager 320 may continue to provide the first application update to the first deployment group 315A and provide the second application update to the second deployment group 315B.

With the deployment of the first application update progressing, the capacity monitor 325 may continue to monitor the network traffic between the first deployment group 315A and the deployment manager 320 and the network traffic between the second deployment group 315B and the deployment manager 320, using the functionalities detailed above. In addition, the deployment manager 320 may monitor the capacity of the first deployment group 315A and the second deployment group 315B, using the functionalities detailed above. Eventually, as the network traffic is rerouted, the capacity monitor 325 may determine that the network traffic between the first deployment group 315A and the deployment manager 320 is null based on the monitoring of the network traffic. Furthermore, the capacity monitor 325 may determine that the network traffic between the second deployment group 315B and the deployment manager 320 is at complete capacity. Complete capacity may encompass the network bandwidth available in connection with the deployment of the second application update. In some embodiments, the capacity monitor 325 may determine that all the network traffic is routed to the second deployment group 315B based on the monitoring of the network traffic. In some embodiments, the capacity monitor 325 may determine that the second deployment group 315B has reached complete capacity, when the number of operational instances 340B of the second deployment group 315B is at a predetermined number.

When the network traffic from the first deployment group 315A is determined to be null and all the network traffic is flowing to the second deployment group 315B, the deployment manager 320 may terminate the first deployment group 315A. In some embodiments, the deployment manager 320 may terminate all the instances 340A of the first deployment group 315A. In this manner, the network bandwidth may be distributed between multiple application updates to different deployment groups in parallel, without negative or otherwise undesirably affect other deployment groups receiving the application updates.

Figure 3B:
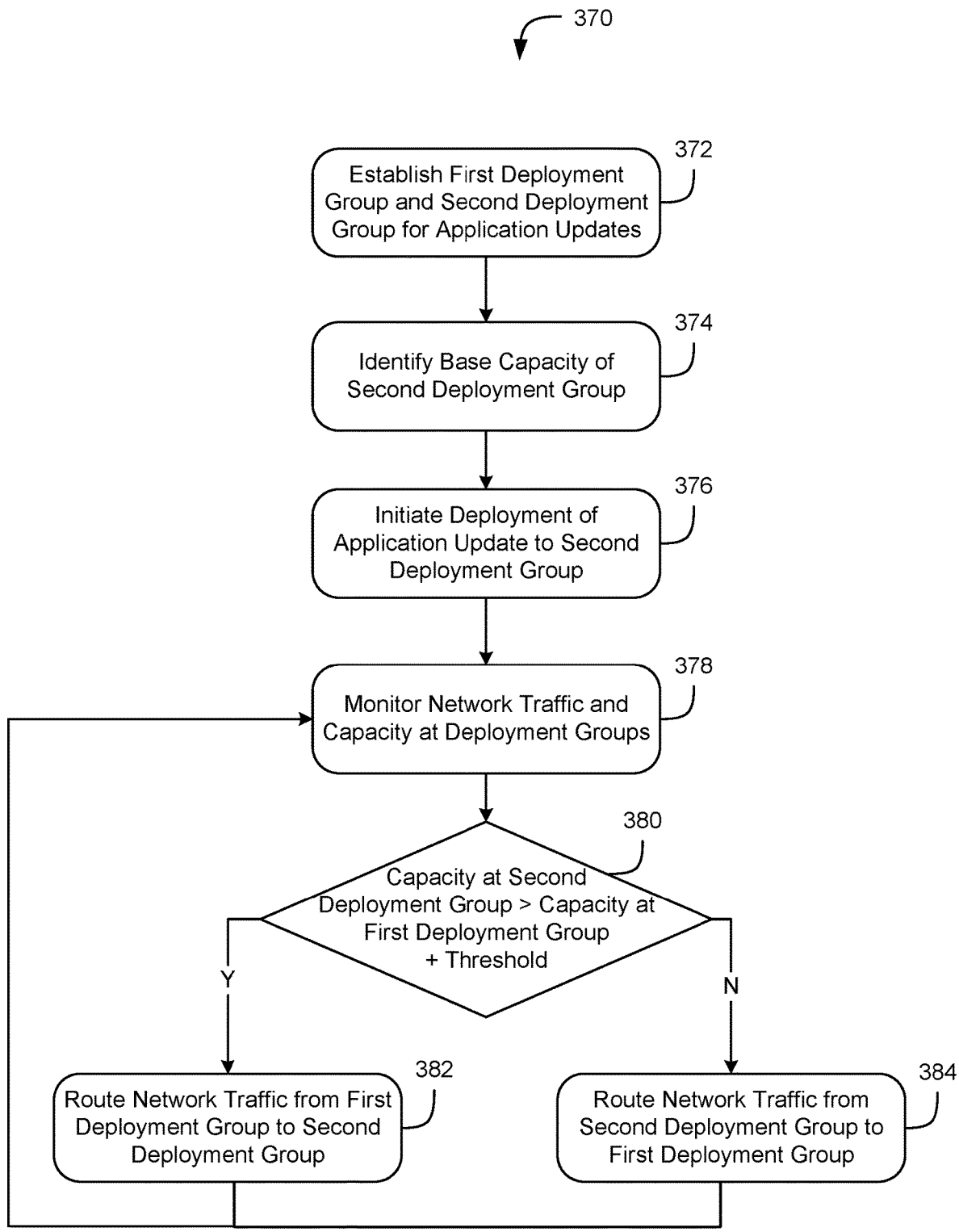
FIG. 3B is a block diagram of an embodiment for a method of provisioning capacity based on network traffic during application deployments.

Referring now to FIG. 3B, depicted is a flow diagram of an embodiment of a method of provisioning capacity based on network traffic during application deployments. The operations and functionalities of the method 300 may be performed by the components described in FIG. 1 and FIG. 3A, the system 100, and/or the system 300 detailed above. In brief overview, a deployment proxy may establish a first deployment group and a second deployment group for application updates (372). The deployment proxy may identify a base capacity of the second deployment group (374). The deployment proxy may initiate deployment of the application update to the second deployment group (376). The deployment proxy may monitor network traffic and capacity at each deployment group (378). The deployment proxy may determine whether the capacity at the second deployment group is greater than the capacity at the first deployment group plus a threshold (380). If the capacity at the second deployment group is greater than the capacity at the first deployment group plus the threshold, the deployment proxy may route the network traffic from the first deployment group to the second deployment group (382). Otherwise, if the capacity at the second deployment group is less than the capacity at the first deployment group plus the threshold, the deployment proxy may route the network traffic from the second deployment group to the first deployment group (384).

In further detail, a deployment proxy may establish a first deployment group and a second deployment group for application updates (372). The deployment proxy may establish the first deployment group for deployment of a first application update. Subsequently, the deployment proxy may establish the second deployment group for deployment of a second application update. Each deployment group may include a load balancer and one or more instances. Each instance of each deployment group may exchange messages with the deployment proxy in connection with the respective application update. When the second deployment group is established, the application update for the first deployment group may have already progressed or been performed.

The deployment proxy may identify a base capacity of the second deployment group (374). The deployment proxy may count an initial number of operational instances in the second deployment group by identifying a number of different identifiers in the messages from the second deployment group. Based on the determined number of operational instances, the deployment proxy may calculate or estimate the base capacity for the second deployment group based on a computing resource measure for each instance.

The deployment proxy may initiate deployment of the application update to the second deployment group (376). In accordance with the base capacity determined for the second deployment group, the deployment proxy may initiate deployment of the application update. The deployment proxy may provide the version of the application corresponding to the application update to the second deployment group. The deployment proxy may initially set an amount of network bandwidth available for data transmitted between the deployment proxy and the second deployment group based on the determined base capacity.

The deployment proxy may monitor network traffic and capacity at each deployment group (378). The deployment proxy may monitor the network traffic of each deployment group may measuring a data throughput of the communications between the deployment proxy and the respective deployment group. The deployment proxy may monitor capacity based on a number of operational instances detected at each deployment group.

The deployment proxy may determine whether the capacity at the second deployment group is greater than the capacity at the first deployment group plus a threshold (380). The threshold may indicate an amount of capacity at which to transfer network traffic or network bandwidth available for the network traffic from the first deployment group to the second deployment group, and vice-versa.

If the capacity at the second deployment group is greater than the capacity at the first deployment group plus the threshold, the deployment proxy may route the network traffic from the first deployment group to the second deployment group (382). Otherwise, if the capacity at the second deployment group is less than the capacity at the first deployment group plus the threshold, the deployment proxy may route the network traffic from the second deployment group to the first deployment group (384). The deployment proxy may set or allocate the network bandwidth available to each deployment group based on the capacity at each deployment group. The functionality of (378)-(384) may be repeated for any number of times until all the network traffic is transferred from the first deployment group to the second deployment group.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of allocating cloud resources for application deployments, comprising:

identifying, by a resource allocator executing on one or more processors, a first computing resource metric and a first network traffic metric indicating usage of cloud resources by a first plurality of clients in a first release environment for an application update;

generating, by the resource allocator, using the first computing resource metric and the first network traffic metric, a resource capacity model for predicting usage of the cloud resources by a second plurality of clients in a second release environment for the application update subsequent to the first release environment;

determining, by the resource allocator, using the resource capacity model, a second computing resource metric and a second network traffic metric predicting the usage of the cloud resources by the second plurality of clients in the second release environment; and generating, by the resource allocator, instructions to set an allocation of the cloud resources for performing deployment of the application update to the second plurality of clients in the second release environment based on the second computing resource metric and the second network traffic metric predicted using the resource capacity model.

2. The method of claim 1, wherein identifying the first computing resource metric and the first network traffic metric further comprises:
aggregating runtime data from the first plurality of clients running the application update in the first release environment;
applying extract-load-transfer (ETL) onto the aggregated runtime data to calculate the first computing resource metric including a rate of processor resource usage and the first network traffic metric including a rate of requests; and
generating a data pair including the rate of processor resource usage of the first computing resource metric and the rate of requests of the first network traffic metric.

3. The method of claim 1, wherein identifying the first computing resource metric and the first network traffic metric further comprises:
aggregating first runtime data from the first plurality of clients running the application update in the first release environment;
eliminating one or more outliers identified based on clustering the first runtime data to generate second runtime data; and
determining the first computing resource metric and the first network traffic metric from the second runtime data.

4. The method of claim 1, wherein identifying the first computing resource metric and the first network traffic metric further comprises:
aggregating Hypertext Transfer Protocol (HTTP) messages communicated by the first plurality of clients running the application update in the first release environment;
identifying a ratio between a number of the first plurality of clients and a number of the second plurality of clients;
sampling the HTTP messages of a pre-specified code based on the ratio between the number of the first plurality of clients and the number of second plurality of clients; and
calculating the first network traffic metric based on the sampling of the HTTP messages.

5. The method of claim 1, wherein generating the resource capacity model further comprises generating the resource capacity model including a regression model, the regression model comprising the first computing resource metric as an explanatory variable and the first network traffic metric as a dependent variable.

6. The method of claim 1, wherein generating the resource capacity model further comprises generating the resource capacity model based on a rate of processor resource usage of the first computing resource metric, a rate of requests of the first network traffic metric, and a noise parameter.

7. The method of claim 1, wherein determining the second computing resource metric and the second network traffic metric furthercomprises:
determining a distribution of consumption metric based on the resource capacity model;
calculating a maximum resource capacity based on a mean value and a standard deviation of the distribution of consumption metric; and
determining the second computing resource metric and the second network traffic metric based on the maximum resource capacity calculated from the mean value and the standard deviation.

8. The method of claim 1, wherein determining the second computing resource metric and the second network traffic metric further comprises determining the second computing resource metric and the second network traffic metric based on the resource capacity model and a security level measure, the security level measure specified based on a number of instances of the second plurality of clients in the second release environment.

9. The method of claim 1, further comprising:
identifying, by the resource allocator, while performing deployment of the application update to the second plurality of clients in the second release environment, a third computing resource metric and a third network traffic metric indicating the usage of the cloud resources by the second plurality of clients in the second release environment for the application update;
modifying, by the resource allocator, the resource capacity model based on the third computing resource metric and the third network traffic; and
updating, by the resource allocator, the instructions to set the allocation of the cloud resources for performing the deployment of the application update in a production environment.

10. The method of claim 1, further comprising executing, by the resource allocator, the instructions to set the allocation of the cloud resources to perform the application update to the second plurality of clients in a production environment corresponding to the second release environment subsequent to a staging environment corresponding to the first release environment.

11. A system for allocating cloud resources for application deployments, comprising:
a resource allocator executable on one or more processors, configured to:
identify a first computing resource metric and a first network traffic metric indicating usage of cloud resources by a first plurality of clients in a first release environment for an application update;
generate, using the first computing resource metric and the first network traffic metric, a resource capacity model for predicting usage of the cloud resources by a second plurality of clients in a second release environment for the application update subsequent to the first release environment;
determine, using the resource capacity model, a second computing resource metric and a second network traffic metric predicting the usage of the cloud resources by the second plurality of clients in the second release environment; and
generate instructions to set an allocation of the cloud resources for performing deployment of the application update to the second plurality of clients in the second release environment based on the second computing resource metric and the second network traffic metric predicted using the resource capacity model.

12. The system of claim 11, wherein the resource allocator is further configured to:
aggregate runtime data from the first plurality of clients running the application update in the first release environment;
apply extract-load-transfer (ETL) onto the aggregated runtime data to calculate the first computing resource metric including a rate of processor resource usage and the first network traffic metric including a rate of requests; and generate a data pair including the rate of processor resource usage of the first computing resource metric and the rate of requests of the first network traffic metric.

13. The system of claim 11, wherein the resource allocator is further configured to:
aggregate first runtime data from the first plurality of clients running the application update in the first release environment;
eliminate one or more outliers identified based on clustering the first runtime data to generate second runtime data; and
determine the first computing resource metric and the first network traffic metric from the second runtime data.

14. The system of claim 11, wherein the resource allocator is further configured to:
aggregate Hypertext Transfer Protocol (HTTP) messages communicated by the first plurality of clients running the application update in the first release environment;
identify a ratio between a number of the first plurality of clients and a number of the second plurality of clients;
sample the HTTP messages of a pre-specified code based on the ratio between the number of the first plurality of clients and the number of second plurality of clients; and
calculate the first network traffic metric based on the sampling of the HTTP messages.

15. The system of claim 11, wherein the resource allocator is further configured to generate the resource capacity model including a regression model, the regression model comprising the first computing resource metric as an explanatory variable and the first network traffic metric as a dependent variable.

16. The system of claim 11, wherein the resource allocator is further configured to generate the resource capacity model based on a rate of processor resource usage of the first computing resource metric, a rate of requests of the first network traffic metric, and a noise parameter.

17. The system of claim 11, wherein the resource allocator is further configured to:
determine a distribution of consumption metric based on the resource capacity model;
calculate a maximum resource capacity based on a mean value and a standard deviation of the distribution of consumption metric; and
determine the second computing resource metric and the second network traffic metric based on the maximum resource capacity calculated from the mean value and the standard deviation.

18. The system of claim 11, wherein the resource allocator is further configured to determine the second computing resource metric and the second network traffic metric based on the resource capacity model and a security level measure, the security level measure specified based on a number of instances of the second plurality of clients in the second release environment.

19. The system of claim 11, the resource allocator further is configured to:
identify, while performing deployment of the application update to the second plurality of clients in the second release environment, a third computing resource metric and a third network traffic metric indicating the usage of the cloud resources by the second plurality of clients in the second release environment for the application update;
modify the resource capacity model based on the third computing resource metric and the third network traffic; and
update the instructions to set the allocation of the cloud resources for performing the deployment of the application update in a production environment.

20. The system of claim 11, the resource allocator is further configured to execute the instructions to set the allocation of the cloud resources to perform the application update to the second plurality of clients in a production environment corresponding to the second release environment subsequent to a staging environment corresponding to the first release environment.

* * * * *